United States Patent [19]

Custer et al.

[11] Patent Number: 5,242,516
[45] Date of Patent: Sep. 7, 1993

[54] CO-EXTRUDED PROFILE STRIP CONTAINING LATERAL WEBS WITH ADHESIVE SUBDIVIDED INTO RIBS

[75] Inventors: Richard G. Custer; Catherine E. Kettner; Mladomir Tomic, all of Appleton, Wis.

[73] Assignee: Reynolds Consumer Products Inc., Appleton, Wis.

[21] Appl. No.: 966,647

[22] Filed: Oct. 26, 1992

Related U.S. Application Data

[60] Division of Ser. No. 842,282, Feb. 26, 1992, Pat. No. 5,216,787, which is a continuation-in-part of Ser. No. 600,764, Oct. 22, 1990, abandoned.

[51] Int. Cl.⁵ ............................................. B29C 47/04
[52] U.S. Cl. ................................ 156/66; 156/244.11; 156/244.24; 156/244.25; 24/572; 24/586; 24/587; 24/588
[58] Field of Search ............... 156/66, 244.11, 244.24, 156/244.25; 24/572, 586, 587, 588

[56] References Cited

U.S. PATENT DOCUMENTS

| | | | |
|---|---|---|---|
| 4,354,541 | 10/1982 | Tilman | 156/66 |
| 4,372,793 | 2/1983 | Herz | 156/66 |
| 4,673,383 | 6/1987 | Bentsen | 156/66 |
| 4,731,911 | 3/1988 | Gould | 24/576 |
| 4,909,870 | 3/1990 | Gould et al. | 156/66 |

FOREIGN PATENT DOCUMENTS

398732  11/1990  European Pat. Off. ............. 24/587

Primary Examiner—Caleb Weston
Attorney, Agent, or Firm—Alan T. McDonald

[57] ABSTRACT

A profile strip has a closure element, made of a first material, which contains a base surface, and lateral webs or flanges extending from the base surface on each side of the closure element. An adhesive layer, made of a second material, different than the first material, is attached to the lateral webs, but not to the base surface, by co-extrusion of the adhesive layer with the lateral webs. The adhesive layer is subdivided into adhesive ribs, with each pair of the two adjacent ribs separated from each other by an adhesive-free area. Sub-dividing the adhesive layer into ribs separated by an adhesive-free area substantially eliminates the deformation of the lateral webs when they—and the adhesive ribs—are cooled after the coextrusion.

14 Claims, 1 Drawing Sheet

CO-EXTRUDED PROFILE STRIP CONTAINING LATERAL WEBS WITH ADHESIVE SUBDIVIDED INTO RIBS

CROSS-REFERENCE TO RELATED APPLICATIONS

This application is a division of Ser. No. 07/842,282 filed Feb. 26, 1992, now U.S. Pat. No. 5,216,787, which is a continuation-in-part of U.S. patent application Ser. No. 07/600,764, filed Oct. 22, 1990, abandoned.

BACKGROUND OF THE INVENTION

1. Field of the Invention

The present invention relates to a profile strip comprising a closure element and lateral webs extending from a base of the closure element, the lateral webs having attached thereto an adhesive layer of a different material than the lateral webs. More particularly, the invention relates to a polyolefin profile strip comprising the lateral webs which is co-extruded with the adhesive layer and to a method of forming a profile strip which may be attached to a package made of a material which is not compatible with the material used to make the lateral webs.

2. Description of Related Art

In the field of packaging, particularly in the area of food packaging, it is often desirable to package items in a package which may be repeatedly opened and closed. For example, when dealing with packaged foods, such as sliced luncheon meats, the consumer may initially use only a portion of the meats contained in one package. By providing a package which may be reclosed by the consumer, the consumer avoids having to locate a storage container for the unused portion of the food in the package. It will be appreciated that reclosable packaging appreciably enhances the marketability of such products.

A typical reclosable package is hermetically sealed by any suitable means, e.g., by a peel seal, a cut-off top, or a combination of the peel seal and a perforation top, which protects the integrity of the package until the consumer initially opens the package. By hermetically sealing a reclosable zipper to the package opening, the consumer may manually reseal the package after its use. A method for hermetically sealing such a reclosable zipper to a package web is disclosed in a copending U.S. patent application of Lawrence W. Wirth, Wayne M. Wegner, Mladomir Tomic, Raymond Buchko and Hans Natterer, Ser. No. 07/342,257, now U.S. Pat. No. 5,067,822, incorporated herein by reference. A reclosable means may also be used in combination with a peel seal.

The reclosable means may include a pressure fastenable seal in the form of a rib or male member located on one package wall and a mating groove or female member located on an opposing package wall. One particularly novel reclosable means is disclosed and claimed in a copending U.S. patent application of Steven H. Simonsen, Mladomir Tomic and Wayne M. Wegner, Ser. No. 07/354,141, filed on May 19, 1989, now U.S. Pat. No. 5,017,021, incorporated herein by reference.

If a package contains a peel seal, after the peel seal has been broken by the consumer, the package can be closed again by aligning the mating groove with the rib and forcing the two into a mating connection. Such a pressure fastenable seal may be easily broken to open the package. This is done by applying forces to separate the rib and the mating groove. By this method, the package may be repeatedly opened and closed by the consumer.

To facilitate the manufacturing of packages employing a reclosable seal, the reclosable seal may be provided in the form of a continuous profile strip which may be manufactured independently from the package itself. Such a profile strip is typically wrapped onto a spool or reel for storage until it is needed to complete the packaging process.

When a product is packaged, the profile strip is unwound from its storage spool and attached to the packaging substrate during the packaging process. Polyethylene sandwich bags provide a good example of the use of a profile strip (which includes a reclosable closure, or "zipper") which is attached to the bag. The profile strip is attached to the bag by heating a flange (also known as a lateral web) on the profile strip and the edge of the bag simultaneously. Because both materials are the same, e.g., polyethylene, they essentially melt together, forming an excellent seal; thus, they are compatible. As used herein, the term "compatible" means that two materials can be effectively heat-sealed together with the application of heat and/or pressure, but substantially without the use of a third material, e.g., an adhesive.

While polyethylene bags having a reclosable zipper are well known in the art, the use of a reclosable zipper in other packaging applications is also desirable in many situations. For example, it has been found that packaging of foods, such as cookies, potato chips, and sandwich meats, can be made more convenient for the consumer if a reclosable zipper is included in the packaging. This is done by employing a profile strip, which includes a reclosable zipper, compatible with the package, and heat sealing the profile strip to one edge of the package.

By way of example, food packages, particularly packages used in the packaging of meats, may be made from an ionomer resin, such as is marketed by DuPont under the trade name SURLYN ®. Multi-layered films may also be used in such a packaging application, with a layer of SURLYN ® either coated, laminated or co-extruded on the side of the film which will be used to heat seal the front and back of the package together with a hermetic seal.

When it is desired to include a reclosable zipper on a package, such as one made of SURLYN ®, it is not uncommon to make the profile strip which employs the zipper from the same material as the package. One reason for choosing the same material for the profile strip is that it will be compatible with the packaging film. Thus, the potential for an unsatisfactory heat seal is reduced by taking advantage of the heat sealing compatibility resulting from heat sealing together a profile strip and a package made of the same material.

However, one frequently occurring disadvantage to the use of the same material in the manufacture of the profile strip as is used for the packaging film (also referred to herein as a "package liner" or a "packaging web"), is that a substantial volume of material is required in the production of the profile strip due to the configuration of the profile strip. For example, when using a material such as SURLYN ®, which is relatively expensive, the manufacture of an all-SURLYN ® reclosable package may be prohibitively expensive for many packaging applications.

Using a different, but cheaper, material for the profile strip would necessarily require that material compatibility would not be maintained, thereby giving rise to problems in obtaining a hermetic seal between the profile strip and the package liner, or heat sealable material. Using a cheaper material for both the package and the profile liner is also not a practical solution because of the design limitations placed on the material choice for use in the package.

For example, some materials, such as certain grades of SURLYN ®, may be used when packaging food products because they are FDA-approved for food contact. Also, SURLYN ® is especially advantageous in a meat packaging application because it will seal through grease and other contaminants, e.g., moisture. Other, cheaper packaging materials may not share these benefits. Thus, whether a package liner will be compatible with a low-cost profile strip usually does not influence the decision of what kind of package liner will be used.

In addition to issues of cost, there are also other disadvantages which arise when attempts are made to employ a profile strip made from the same material as the package liner, depending on the particular material considered. To use SURLYN ®, as an example, one disadvantage which results from the use of SURLYN ® profile strips is that SURLYN ® tends to post-crystallize over time. As explained above, after the profile strips are formed, they are wound onto spools, which enables the profile strips to be stored in a continuous form until they are used in the packaging process. Unless the SURLYN ® profile strips are used shortly after they ar made, the SURLYN ® may begin to post-crystallize (also referred to herein simply as "crystallize") on the spool.

Crystallization of the SURLYN ® profile strips causes the strips to harden. In addition, crystallization also causes the profile strips to shrink. Additional shrinkage results as the profile strips cool on the spools. The effect of the shrinkage and hardening of the profile strips is that they become tightly wrapped around the core of the spools. Thus, when the SURLYN ® strips are removed from the spools, they may have a significant amount of camber—plastic deformation corresponding to the curvature of the spools.

Because the profile strips must be substantially flat when attached to the package on which they are to be used, the camber must be removed from the profile strips before they may be heat sealed to a packaging film. One method which has been used to straighten out the profile strips is to apply a substantial amount of tension to the profile strips prior to their attachment to the package.

Disadvantageously, the conventional equipment used in the packaging process is ill-suited for imparting such tensile forces to the profile strips. In addition, in some instances it may be impossible to remove the camber from the profile strips without destroying the strips. It will be appreciated by those skilled in the art that if a separate manufacturing process had to be employed to remove deformation from the profile strip, the cost of the packaging process would be significantly increased. Indeed, in some instances, the cost increase would be prohibitively high, causing the manufacturer to abandon the deformed profile strip. Additionally, some profile strips may deform and harden to such an extent that it may be impossible to remove deformation therefrom, and, as a result, they, too, may have to be discarded.

Thus, it can be seen that there are serious disadvantages associated with using a SURLYN ® profile strip to be used as a reclosable closure for a package also made of SURLYN ®.

Although the problems of deformation on the spools appear to be unique to SURLYN ® packaging, high cost remains an issue with materials other than SURLYN ® which are popular for use with food products because they have FDA approval. Thus, the primary disadvantage in employing a reclosable closure on food packaging is that in order to achieve an acceptable heat seal of the profile strip to the package, the profile strip must be made of the same expensive material used for making the package, or used for making the seal layer of the packaging web.

It has been suggested to use a polyolefin material, such as polyethylene, to make a profile strip for such an application. Polyethylene is substantially less expensive than most materials used as a seal layer for packaging. However, as indicated previously, a primary obstacle in the use of a polyethylene profile strip with such packaging is that polyethylene is not compatible with SURLYN ® and other similar materials which are commonly used for making packaging webs, especially packaging webs for packaging foods.

It has been proposed to coat a polyethylene profile strip with an adhesive that would enable the polyethylene to seal to the packaging film. Coating, however, gives rise to several additional problems.

The method of coating is inconsistent. Coating tends to "spot," resulting in portions of the profile strip without adhesive, thereby causing a defective seal to occur. Additionally, some portions of the adhesive may be thicker than others, resulting in an inconsistency of the thickness of the resulting profile strip.

One significant limitation of coating is that only a thin layer of coating may be applied at a time. Several passes through the coating process may be necessary to build up the desired amount of adhesive. Thus, while coating itself requires an extra step in the manufacturing process, several extra steps may be required if the profile strips must be repeatedly coated to obtain a desired thickness of adhesive.

A more significant disadvantage to the use of a coating process is that many of the adhesives which are capable of being coated contain solvents. When used in an application involving food, FDA regulations may not allow the use of these adhesives because of the tendency of the solvents, which have a low molecular weight, to migrate through the package film and into the food.

Tilman, U.S. Pat. No. 4,354,541, discloses a closure strip of plastics material for use in manufacturing a resealable bag. The closure strip has a longitudinally extending profiled closure element upstanding with respect to one face of a ribbon-like base element and an opposite face surface adapted to be adhesively attached to the bag material. The opposite face surface includes adhesive-containing narrow spacer rib means projecting from the surface about the same distance as the desired thickness of the layer of the adhesive. The rib means define an adhesive layer-receiving wide channel area several times as wide as the rib means, and the rib means is adapted to maintain the opposite face surface spaced the same distance as the thickness of the adhesive layer from the surface of the substrate (the bag) when pressure is applied for pressing the strip and the substrate together. The adhesive is applied to the channel area, usually in the form of a bead by an adhesive applicator system. The adhesive-receiving area may extend along most of the opposite face surface, or a portion thereof. In one embodiment, the adhesive-receiving area extends only along that portion of the opposite face surface which is not directly under the profiled closure element.

Herz, British Patent Application No. 2 080 412, discloses a fastener strip having a profiled portion extending lengthwise, with an at least one face of the strip having a zone extending generally parallel to the profiled portion. The zone is at least partially covered with a layer of a heat-reactivatable adhesive. The adhesive may be deposited as a continuous layer or as a discontinuous layer, e.g., in the form of a plurality of bands separated by spaces without the adhesive. The adhesive is advantageously deposited continuously, at the outlet from the extrusion head producing the profiled connecting strips of the synthetic material. It has been found that the application of hot-melt adhesive to a previously formed profile strip in the manner of this patent produces an intermediate layer between the adhesive and the profile strip. Without wishing to be bound by any theory of operability, it is believed that this intermediate layer is formed of remelted and resolidified material from the profile strip. It has also been found that care must be taken in applying a hot-melt adhesive to a profile strip in the manner of this patent to avoid delamination between the profile strip and the adhesive after cooling.

Bentsen, U.S. Pat. No. 4,673,383, discloses a plastic separable fastener strip comprising a body having a base surface and a profile means projecting from the opposite end of the body than the base surface. The base surface is provided with a plurality of ribs having spaces therebetween. The principal consideration in determining the mass versus spacing relationship of the ribs is that the ribs can be fused without significant transfer of the fusion temperature to the fastener strip body. The ribs are made from the same material as the base surface.

Gould, U.S. Pat. No. 4,835,835, discloses a separable fastener profile strip made by a method comprising thermoplastically extruding the strip and providing it with a base surface, applying an adhesive in a fluent state to the base surface during extrusion of the strip, curing the extruded strip, and curing the adhesive on the base surface concurrently with curing of the strip. The fastener profile strip of Gould is free of lateral flanges.

However, in some industrial applications it is desirable, if not necessary, to produce a profile strip containing a closure element and lateral webs extending outwardly from base surface of the closure element. For example, vertical and horizontal form, fill, and seal machines are commonly used to partially form a package, fill the package with the package contents, and attach a profile strip to the package. When the profile strip is used in such machines, it is desirable to have a profile strip with two lateral webs extending from the opposite sides of the base of the strip to provide a means for handling and advancing the strip into engagement with the substrate. The lateral webs also enable the strip-guiding portion of the machines to steadily hold the strip and advance it into a precise alignment position with the substrate. The lateral webs also provide a convenient vehicle for carrying a layer of adhesive for attaching the strip to the substrate.

It is also advantageous in some industrial applications to co-extrude a layer of adhesive onto the lateral webs simultaneously with the extrusion of the strip containing the lateral webs. Co-extrusion reduces the cost of producing the strip because it integrates the adhesive-deposition step with the strip extrusion step, thereby eliminating a separate step in the manufacture of the strip. In addition, co-extrusion does not result in the formation of an intermediate layer between the adhesive and the profile strip, reducing the possibility of delamination.

Since the adhesive layer is different than the material used for forming the lateral webs, the adhesive layer has different physical properties, such as a coefficient of contraction. When the adhesive layer is co-extruded as a single, continuous layer with the lateral webs and the profile strip, subsequently to the co-extrusion step, the lateral webs, the profile strip and the adhesive layer are cooled to produce the finished profile strip having lateral webs containing the adhesive layer. However, the cooling step often results in deformation of the lateral webs. The deformation of the lateral webs causes operational problems since it is difficult to obtain a hermetic seal between the profile strip having deformed lateral webs and the substrate. The deformation also reduces the effectiveness of the lateral webs as a means of handling and guiding the strip since the deformed lateral webs do not provide a dependable means of guiding the strip, and, in fact, may cause the machines to malfunction.

SUMMARY OF THE INVENTION

A profile strip comprises a closure element, which comprises a base surface, and one lateral web extending outwardly from the base surface on each side of the closure element. The closure element and the lateral webs are made of the same material, referred to herein as a first material. An adhesive layer, made of a second material, different from the first material, is attached to the lateral webs but not to the base surface. The adhesive layer is attached to the lateral webs by co-extruding the adhesive layer with the lateral webs, and it is sub-divided on the lateral webs into at least two adhesive ribs on each of said lateral webs. Each two of the adhesive ribs adjacent to each other are separated by an adhesive-free area on said lateral webs.

There is also provided a method of producing the aforementioned profile strip having the lateral webs which are substantially free of deformation. The method comprises co-extruding the adhesive with said lateral webs in such a manner that said adhesive layer is sub-divided into at least two adhesive ribs on each of the lateral webs, with each two of the adhesive ribs adjacent to each other being separated by an adhesive-free area on the lateral webs.

In some embodiments, a tie layer is employed between the adhesive layer and the lateral webs. The tie layer is also subdivided into ribs placed at positions substantially corresponding to the positions of the adhesive ribs. Each two adjoining tie layer ribs are also separated by a tie layer-free area. The tie layer comprises a material which is compatible with both the adhesive layer and the material used for making the lateral webs. If the tie layer is necessary, all three components, the adhesive layer, the tie layer, and the lateral webs, are co-extruded to form the profile strip. The resulting profile strip may then be wrapped onto a spool and stored until it is needed to be attached to a substrate during a packaging process.

In use, the profile strip is attached to a substrate, e.g., a film used for making food packages, made from a material different from and not compatible with the first material.

By sub-dividing the adhesive layer into the adhesive ribs, the deformation of the lateral webs upon cooling of the profile strip is substantially eliminated. Additionally, the amount of the adhesive utilized in the production of the profile strip—and therefore the cost of producing the profile strip—is reduced.

The base surface is free of the adhesive layer so that when pressure is applied to the profile strip to seal it to the substrate, the pressure, which may damage the closure elements, is not applied to the closure elements. Additionally, in a finished product (e.g., a food package) comprising two layers of a substrate, each comprising a reclosable element, with the two reclosable elements engaging each other to form a reclosable seal, the adhesive-free base provides a reclosable seal substantially independent of the package. Thus, the movements of the package or any contents thereof will not necessarily translate to the reclosable seal and are not likely to disturb the integrity of the reclosable seal.

Other advantages of the invention will become apparent from the following description of the preferred embodiments and the accompanying drawings.

DETAILED DESCRIPTION OF THE PREFERRED EMBODIMENTS OF THE INVENTION

Figure 1:
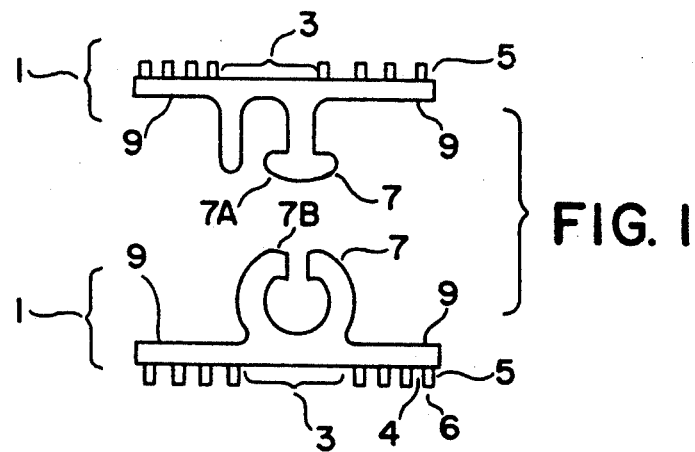
FIG. 1 is a cross-sectional view of one preferred embodiment of a set of profile strips of the invention.

With reference to FIG. 1, representing one preferred embodiment of the invention, profile strips made according to the present invention are generally designated by the numeral 1. Each profile strip comprises a lateral web (also referred to herein as a flange) 9, a reclosable element 7 and an adhesive layer 5.

The reclosable elements 7 act in combination with each other to form a reclosable seal. Reclosable elements 7 may be any one of reclosable elements known in the art. Each of the reclosable elements 7 comprises a male or a female closure elements 7A or 7B, respectively, and a base surface 3 placed substantially opposite from the male or female closure elements. The base surface 3 has substantially the same width as the closure elements 7A or 7B.

The lateral webs and the reclosable elements of any one of the embodiments of the invention (e.g., those of FIGS. 1–3) are preferably made of a material, referred to herein as a first material, which is not compatible with a material used for making a substrate to which the profile strip is to be attached. The lateral webs and the reclosable elements are preferably made from a polyolefin material, such as a high pressure, low density homopolymer of ethylene having a density of about 0.918 to about 0.925 g/cc. In a preferred embodiment of the present invention, the lateral webs and the reclosable elements are made of polyethylene. Alternatively, the lateral webs and the reclosable elements may also be made of polyvinyl chloride (PVC). It will be appreciated that any material possessing a low contraction rate as a result of crystallization and a low coefficient of thermal expansion may be used for the construction of the lateral webs and the reclosable elements.

The use of a low-cost material, such as low density polyethylene (LDPE), for making the lateral webs and the reclosable elements, results in a significant savings in materials cost in the construction of the profile strip compared to a profile strip made of a substantially pure ionomer resin, such as SURLYN ®. Although the actual volume of the ionomer resin needed for a single profile strip may appear small, a facility capable of rapid mass production would utilize large amounts of the ionomer resin. Thus, even a minor cost savings in such a material can result in a significant reduction in materials cost.

The profile strip is intended to be adhered to a substrate. The substrate is, e.g., a film used to make a plastic bag. The substrate, in all embodiments of the invention, is made of a material used for making various articles, e.g., food bags, such as an ionomeric polymer, e.g., SURLYN ®, or any other ionomeric polymer commonly utilized in the packaging industry. Other materials which may be used for making the substrate include, e.g., ethylene vinyl acetate (EVA).

Because polyolefins are not compatible with ionomeric resins, such as SURLYN ®, an adhesive layer 5 is employed to provide an adequate seal between the substrate and the lateral web 9. Thus, the adhesive layer 5 must be made of a material which will adhere well to both the lateral web 9 and the substrate. In a typical packaging process, such as a form, fill and seal process, the profile strip is hermetically sealed to the substrate. Thus, the adhesive layer 5 must be made from such a material which provides a hermetic seal between the adhesive layer 5 and the substrate.

The adhesive layer 5 is co-extruded with the lateral webs in such a manner that the adhesive layer is sub-divided into at least two adhesive ribs 6, with each of the two adjacent adhesive ribs 6 being separated from each other by an adhesive-free area 4. The adhesive layer is made of a second material, different than said first material. The second material has a substantially different coefficient of contraction than the first material, i.e., the coefficient of contraction of the second material is different by at least about 10%, and preferably at least about 25% from that of the first material. The term "coefficient of contraction" designates the degree of contraction of a material when it is cooled from a molten state to room temperature. The base surface 3 is substantially free of the adhesive layer, i.e., there are no ribs 6 on the base surface 3. The relationship between the height and the width of the adhesive ribs 6 must be such that each of the ribs contains a sufficient amount of the adhesive to provide a strong bond between the substrate and the profile strip 1. The adhesive-free areas 3 and 4 must separate the ribs 6 by such a distance that, upon cooling of the lateral webs co-extruded with the adhesive ribs 6, the lateral webs are substantially free of deformation.

Without wishing to be bound by any theory of operability, it is believed that, due to the difference in the coefficients of contraction between the first and the second materials, the co-extrusion of the adhesive layer as a single, continuous layer simultaneously with the lateral webs, and subsequent cooling of the lateral webs and the adhesive layer, results in deformation of the lateral webs, evidenced by curling of the lateral webs in the direction of the material having higher coefficient of contraction. We discovered that subdividing the adhesive layer into the adhesive ribs while the adhesive is co-extruded with lateral webs substantially eliminates the deformation of the lateral webs.

The exact dimensions of the adhesive strips 6 and the adhesive-free area 4 will depend on the type of adhesive used for the adhesive layer and for the lateral webs. One of ordinary skill in the art will be readily able to determine such exact dimensions, with minimal experimentation, for a particular combination of the materials used for the adhesive ribs 6 and the lateral webs 9, so long as the combination produces a profile strip which, upon cooling, has lateral webs substantially free of deformation.

In one preferred version of the embodiment of FIG. 1, illustrated in that figure, each of the lateral webs contains four adhesive ribs, each rib having a width of about 0.010 inches and height of about 0.006 inches, and each pair of the adjoining adhesive ribs is separated by an adhesive-free area having a width of about 0.011 inches.

For purposes of exemplification, in all embodiments of the invention, each of the ribs may have a width of about 0.005 to about 0.012 inches and height of about 0.004 to about 0.007 inches, and each pair of the adjoining adhesive ribs may be separated by an adhesive-free area having a width of about 0.005 to about 0.012 inches.

According to the present invention, the profile strip 1 is constructed by coextruding the adhesive layer 5 and the lateral webs 9. By utilizing the co-extrusion process, a continuous length of the profile strip is produced in such a manner that it may be wrapped onto a spool and stored until it is needed to complete the packaging process.

Because polyethylenes usually have a relatively low amount of post-crystallization, only an insignificant amount of plastic deformation will result in the lateral webs 9 (made from polyethylenes) during the time the profile strip 1 is stored on a spool. This is in contrast to a lateral web made of an ionomer resin, such as SURLYN ®, in which the profile strip may plastically deform to assume the curvature of the spool.

Figure 2:
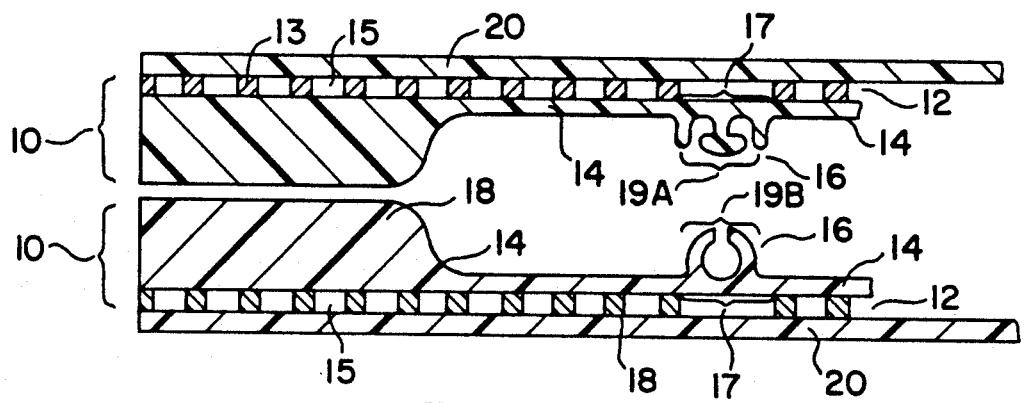
FIG. 2 is a cross-sectional view of a set of profile strips made according to the present invention shown in combination with two packaging films.

Referring now to FIG. 2, illustrating an alternative embodiment of the invention, profile strips illustrated therein are generally designated by the numeral 10. Each profile strip comprises a lateral web (also referred to herein as a flange) 14, a reclosable element 16, and an adhesive layer 12.

The reclosable elements 16 act in combination with each other to form a reclosable seal. Reclosable elements 16 may be any one of reclosable elements known in the art. Each lateral web 14 may include a thickened section 18. The thickened section 18 may be used to aid in opening the resulting package by giving a customer a greater mass of material to grasp. The thickened section may also allow two substrates 20 to be bonded to both of the lateral webs 14 at the same time without also sealing the lateral webs 14 together, as explained more fully in U.S. patent application Ser. No. 07/342,257, now U.S. Pat. No. 5,067,822, incorporated herein by reference. In the embodiment(s) using the thickened section(s), the adhesive ribs 13 may only need to be placed on the portion of the lateral webs having the thickened section(s) 18. Each of the reclosable elements 16 comprises a male or female closure elements 19A or 19B, respectively, and a base surface 17 placed substantially opposite from the male or female closure elements. The base surface 17 has substantially the same width as the closure elements 19A or 19B.

A substrate 20, such as a film used to make a typical plastic bag, is illustrated in combination with each profile strip 10. A typical substrate 20 may be made of an ionomeric polymer, such as SURLYN ®, or any other ionomeric material commonly utilized in the packaging industry. Other materials which may be used for making the substrate 20 may include, for example, ethylene vinyl acetate (EVA).

An adhesive layer 12 is employed to provide an adequate seal between the substrate 20 and the lateral web 14. Thus, the adhesive layer 12 must be constructed of a material which will adhere well to both the lateral web 14 and the substrate 20. In a typical packaging process, such as that used with a form, fill and seal machine, the profile strip 10 is hermetically sealed to the substrate 20. Thus, the adhesive layer 12 must be made from such a material which will provide a hermetic seal between the adhesive layer 12 and the substrate 20. The adhesive used in all embodiments of the invention is preferably a heat-activated adhesive, and most preferably a pressure- and heat- activated adhesive. Examples of suitable adhesives are ethylene vinyl acetate (EVA), ethylene acrylic acid, a polymer rubber resin blend, ethylene-methyl acrylate and similar adhesives. Examples of specific adhesives which may be used are SURLYN ®, NUCREL ®, BYNEL CXA ®, PRIMACOR ® and PLEXAR ®. The most preferred adhesive in one embodiment of the invention is ethylene vinyl acetate comprising about 18 to about 40% of EVA resin. Any other suitable adhesive materials may also be used for an adhesive layer, such as the layer 12.

The adhesive layer 12 is sub-divided into a multiplicity of adhesive ribs 13, with each of the two adjacent adhesive ribs 13 being separated from each other by an adhesive-free area 15. The base surface 17 is substantially free of the adhesive layer, i.e., there are no adhesive ribs 13 on the base surface 17. The base surface 17 is substantially free of the adhesive layer so that pressure, usually used to attach the profile strip to the substrate 20, is not applied to the reclosable elements 16, placed on the opposite side of the base surface. Application of pressure to the base surface during the step of attaching the profile strip to the substrate may damage the reclosable elements. An additional advantage arising from the absence of adhesive on the base surface 17 is that the reclosable seal formed by the reclosable elements 16 is independent of the movement of the substrate. Thus, the movements of the substrate, which is often made of a more rigid material than the closure elements, are not likely to affect the integrity of the reclosable seal. For example, if the substrate is made of SURLYN ®, a relatively rigid material, and formed into a food-holding package, and the reclosable elements are made of polyethylene, the movement of the package or its contents is not likely to disturb the integrity of the reclosable seal, i.e., it is not likely to separate the reclosable elements 16 from a locked position. This is due to the substantial independence of the base surface—and therefore the reclosable elements—from the food package provided by the lack of the adhesive layer on the base surface. Thus, the lack of the adhesive layer on the base surface breaks a relatively inflexible coupling of the substrate to the lateral webs—and hence to the closure elements—provided by the adhesive layer adhering the lateral webs to the substrate in the areas outside of the base surface. The advantages achieved for the embodiment of FIG. 2 by the lack of the adhesive layer on the base surface are the same for all of the other embodiments of this invention.

The relationship between the height and the width of the adhesive ribs 13 is determined by the same factors as those discussed above in conjunction with FIG. 1, i.e., it must be such that each of the adhesive ribs contains a sufficient amount of the adhesive to provide a strong bond between the substrate 20 and the profile strip 10. The adhesive-free area 15 must separate the ribs 13 by such a distance that, upon cooling of the lateral webs co-extruded with the adhesive ribs 13, the lateral webs are substantially free of deformation.

The exact dimensions of the adhesive ribs 13 and the adhesive-free area 15 will depend on the type of adhesive used for the adhesive layer and for the lateral webs. One of ordinary skill in the art will be readily able, with minimal experimentation, to determine exact dimensions for a particular combination of the materials used for the adhesive ribs 13 and the lateral webs 14, so long as the combination produces a profile strip which, upon cooling, has lateral webs substantially free of deformation.

According to the present invention, the profile strip 10 is constructed in the same manner as in the embodiment of FIG. 1, i.e., by co-extruding the adhesive layer 12 and the lateral webs 14.

Figure 3:
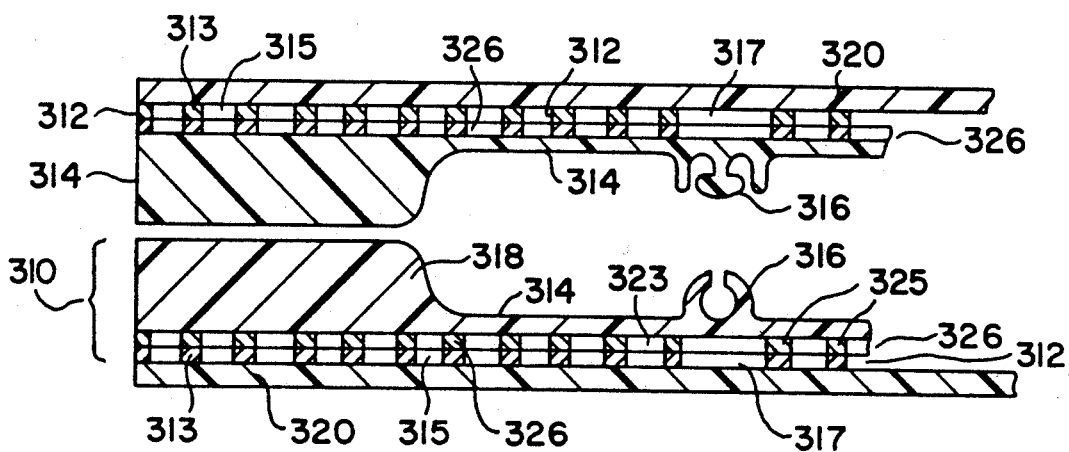
FIG. 3 is a cross-sectional view of a set of profile strips made according to an alternative embodiment of the present invention also including a tie layer and also illustrated in combination with two packaging films.

FIG. 3 illustrates an alternative embodiment of the invention wherein a tie layer is employed between adhesive layer and lateral webs. In FIG. 3, all elements common to FIG. 2 are numbered with the same reference numbers as in FIG. 2, but they are preceded by a prefix 3. For example, the reclosable elements 316 of FIG. 3 correspond to reclosable elements 16 of FIG. 2. With reference now to FIG. 3, a profile strip 310 is illustrated which comprises a lateral web 314, a tie layer 326, and an adhesive layer 312. The combination of the tie layer 326 and the adhesive layer 312 has approximately the same thickness as the single adhesive layer 12 of FIG. 2. In one preferred embodiment of the invention, this thickness may range from approximately two to approximately four mills.

A profile strip 310 employing the tie layer 326 may be employed in situations when the adhesive layer 312 is not compatible or co-extrudable with the lateral web 314. In such situations, it is frequently possible to select a tie layer 326 which will adhere well to the lateral web 314 and to the adhesive layer which will, in turn, adhere well to the substrate 320, and make the selection such that the tie layer 326 and the adhesive layer 312 also adhere well to each other. Thus, each adjacent layer is compatible.

For example, if the substrate 320 is made of SURLYN ® and polyethylene is used in the construction of the lateral web 314, it may be desirable to employ a SURLYN ® adhesive as the adhesive layer 312 since it enjoys substantial compatibility with the SURLYN ® substrate. For this combination of materials, an appropriate tie layer 326 may be made of BYNEL CXA ® adhesive.

When a profile strip employing a tie layer is employed, the tie layer 326 and the adhesive layer 312 are co-extruded with the lateral web 314 to form the profile strip 310, in much the same manner as described in connection with FIGS. 1 and 2, above.

The adhesive layer 312 is sub-divided into adhesive ribs 313, with each two of the adhesive ribs being separated from each other by an adhesive-free area 315. The adhesive ribs 315 are co-extruded with the lateral webs 314 in such a manner that the adhesive ribs 313 are deposited on the lateral webs parallel to the direction of extrusion of the lateral webs 314. If, the tie layer 326 is made of a material which would cause the lateral webs to deform after the lateral webs and the tie layer are cooled, subsequently to the co-extrusion thereof, the tie layer is also subdivided into tie layer ribs 325, with each of the two adjacent tie layer ribs 325 separated from each other by a tie layer-free area 323. In such an event, each of the tie layer ribs 325 is placed substantially under a corresponding adhesive rib 313, as illustrated in FIG. 3. The dimensions of the adhesive ribs 313, of the adhesive-free areas 315, the tie layer ribs 325 and the tie layer-free areas 323 and 317 are controlled by the same factors as were discussed above in connection with the embodiments of FIGS. 1-3, and can be determined in the same manner as discussed above in connection with the embodiments of FIGS. 1-3. If the tie layer is made of a material which would not cause the lateral webs to deform after the cooling step, the tie layer may be co-extruded with the lateral webs as a single, continuous layer, providing that the base surface 317 is free of the tie layer and of the adhesive ribs.

In FIGS. 2 and 3, the adhesive ribs are shown before heat and/or pressure is applied thereto to seal the lateral webs to the substrate. After the lateral webs are sealed to the substrate, the adhesive ribs may be deformed to some extent.

The lateral webs and the closure elements of all embodiments of the invention are preferably made of a polyethylene resin, e.g., a homopolymer of ethylene or a mixture of the homopolymer and ethylene-vinyl acetate copolymer.

The substrate to which the profile strip of the invention is attached is preferably made of an ionomer resin, such as SURLYN ® (a trademark of DuPont de Nemours & Co.), ethylene vinyl acetate, linear low density polyethylene, high density, low pressure polyethylene or any other suitable materials. The ionomer resins seal well even in the presence of water on their surface and therefore they are preferred materials for food packaging applications.

In all embodiments of the invention, the profile strip may also include a peel seal material, i.e., a material capable of forming a hermetic seal that may be peeled apart by a customer without tearing the packaging film (the substrate). The use of at least one strip of peel seal material on the front face of profile strips (i.e., on the side of the profile strips on which the closure elements 316 are placed) is disclosed in U.S. patent application Ser. No. 07/354,252, filed May 19, 1989, incorporated herein by reference.

The adhesive ribs in all embodiments of the invention may have any desired shape, e.g., rectangular as shown in FIGS. 1-3, or any other desired shape, e.g., rectangular with indentations on the bottom surface thereof.

An alternative embodiment within the scope of this invention contemplates depositing a continuous layer of adhesive onto the lateral webs by co-extrusion of the lateral webs and the adhesive, and intentionally deforming each of the lateral webs in a direction opposite to that in which they would be deformed after cooling.

The intentional deformation is of substantially the same magnitude as the deformation caused upon cooling of the lateral webs and the co-extruded single, adhesive layer. Once the intentional deformation is applied to the lateral webs, the adhesive layer may be deposited on the lateral webs as a continuous layer. Since the intentional deformation is likely to substantially completely counteract the deformation occurring after the cooling of the lateral webs and the single, continuous adhesive layer, the lateral webs will be substantially free of deformation once they are cooled. The lateral webs are usually intentionally deformed during the extrusion process.

It will be apparent to those skilled in the are that specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. A method of producing a profile strip which comprises:
    a closure element made of a first material, the closure element comprising a base surface;
    one lateral web extending outwardly from the base surface on each side of the closure element and made of said first material; and, an adhesive layer made of a second material, different than said first material, said adhesive layer attached to each of the lateral webs but not to the base surface by co-extrusion of the lateral webs and said adhesive layer,
    said method comprising co-extruding said adhesive layer with said lateral webs in such a manner that said adhesive layer is subdivided into at least two adhesive ribs on each of said lateral webs, with each two of said adhesive ribs adjacent to each other being separated by an adhesive-free area on said lateral webs, thereby producing said profile strip having the lateral webs substantially free of deformation.

2. A method of claim 1 wherein said lateral webs and said adhesive layer are cooled after co-extrusion.

3. A method of claim 2 wherein said first material has a substantially different coefficient of contraction than said second material.

4. A method of claim 3 wherein the width and the height of said adhesive ribs and the width of said adhesive-free area is such that said lateral webs are substantially free of deformation after said lateral webs and said adhesive layer are cooled.

5. A method of claim 4 wherein said adhesive layer is attached to the bottom surface of each of said lateral webs.

6. A method of claim 5 wherein the profile strip additionally comprises a peel seal material on the front face of the profile strip.

7. A method of claim 6 wherein the first material comprises polyethylene.

8. A method of claim 7 wherein the first material comprises low density polyethylene.

9. A method of claim 1 wherein the first material comprises polyvinyl chloride.

10. A method of claim 1 wherein the second material comprises a heat-activated adhesive.

11. A method of claim 1 wherein the second material comprises a heat- and pressure-activated adhesive.

12. A method of claim 11 wherein each of said adhesive ribs is parallel to said closure element.

13. A method of claim 11 wherein the profile strip additionally comprises a tie layer attached to said adhesive layer.

14. A method of claim 11 wherein the second material is ethylene vinyl acetate, ethylene acrylic acid, a polymer rubber resin blend or ethylene-methyl acrylate.

* * * * *